Sept. 27, 1932.  J. R. SILVERMAN  1,879,769
LENS
Filed Oct. 22, 1930
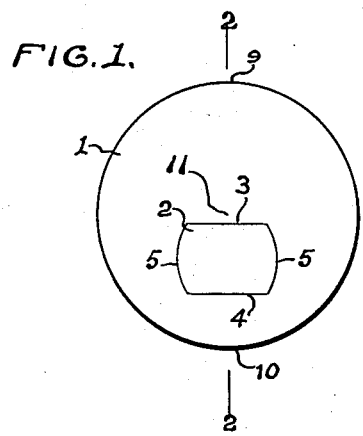
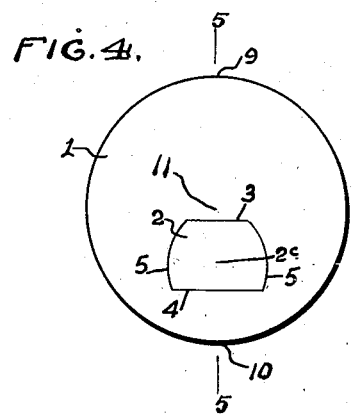
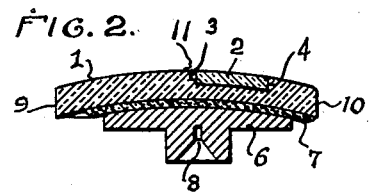
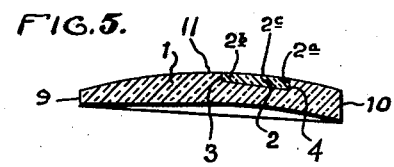
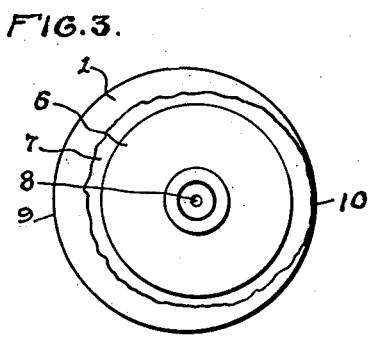
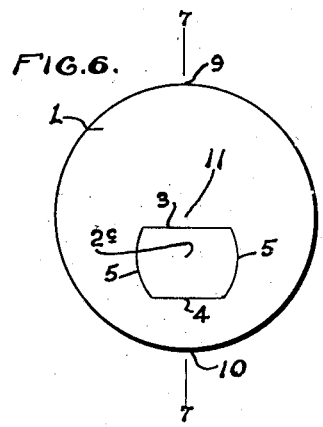
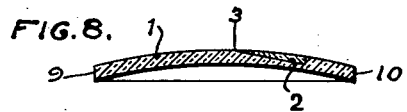
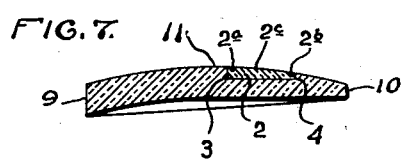
JACK R. SILVERMAN,
Inventor Patented Sept. 27, 1932

1,879,769

UNITED STATES PATENT OFFICE

JACK R. SILVERMAN, OF DAYTON, OHIO, ASSIGNOR, BY MESNE ASSIGNMENTS, OF ONE-HALF TO THE UNIVIS CORPORATION, OF WILMINGTON, DELAWARE, A CORPORATION OF DELAWARE, AND ONE-HALF TO UNITED KINGDOM OPTICAL COMPANY, LIMITED, OF LONDON, ENGLAND

LENS

Application filed October 22, 1930. Serial No. 490,390.

My invention relates to lens and, in particular, to bifocal lens.

It is the object of my invention to eliminate prismatic imbalance by controlling the position of the optical center of the reading section: and to control the optical center of a bicentric bifocal by grinding the lens so as to change the shape of the insert, putting the prism of the insert either up or down and thereby controlling the location of the optical center.

It is my object to provide a bifocal lens with a zonal insert having a flat top and bottom, curved sides and curved back as a standard raw stock lens blank so that only one lens blank type need be employed from which any form of prism up or down and any location of optical center can be secured by decentering the lens block and grinding the surface of the lens to the prescription required.

It is my object to provide a method of so grinding that, by centering the lens block towards the geometrical center of the main lens, that is, by pushing the lens block towards the top of the main lens, the prism base will be placed down, the optical center of the insert will be moved downwardly, and the top dimension of the flat top of the zonal insert will be decreased in proportion to the lower side of the insert; and, when it is desired to reduce the lower side in length, place the prism up and the optical center up, then the lens block is moved towards the lower edge.

Referring to the drawing:

Figure 1 is a top plan view of a lens blank;

Figure 2 is a section on the line 2—2 of Figure 1 showing the lens blank mounted upon a lens block prior to grinding;

Figure 3 is a bottom plan view thereof;

Figure 4 is a plan view of a finished lens blank with the prism down and the optical center down on the insert;

Figure 5 is a section on the line 5—5 of Figure 4;

Figure 6 is a plan view of a finished lens blank with the optical center up and the prism up;

Figure 7 is a section on the line 7—7 of Figure 6;

Figure 8 is a section through the center of the lens and as taken along the line 5—5 of Figure 4, when the lens has been ground to its final form;

Figure 9 is a section on the line 7—7 of Figure 6 when the lens has been ground to its final form.

Referring to the drawing in detail, 1 is a long distance lens and 2 a zonal insert having a flat top 3, a flat bottom 4 and rounded sides 5. This zonal insert is of the same general character as that set forth in the Watson and Culver Patent No. 1,632,208, issued June 14, 1927.

I take the raw lens blank in which the insert 2 is of a different glass from that of the main lens 1 for near vision purposes and mount it upon a lens block 6 by a layer of pitch 7.

By determining the relative position of the center 8 of the lens block with respect to the top edge 9 and the lower edge 10 of the lens blank, I am enabled to throw the prism and optical center up or down.

For instance, in Figures 4 and 5, it will be noted that the insert is thicker at $2a$ than at $2b$ and the optical center of the insert will be approximately at $2c$.

Whereas, by grinding the lens to the form shown in Figures 6 and 7, the prism is up at $2a$, the smaller end is at $2b$, which is adjacent the lower edge 10 of the lens and the optical center $2c$ is up. In Figures 6 and 7, the top line 3 is longer than the bottom line 4 of the insert, whereas, in Figures 4 and 5, the top line 3 is shorter than the bottom line 4.

Thus, I am enabled by grinding the uniform zonal insert bifocal lens blank by the displacement of the lens block up and down to determine the bifocal center of the insert and the location of the prism.

By this arrangement, I am enabled to eliminate the prismatic imbalance by controlling the position of the optical center of the reading section. I control the optical center of a bicentric bifocal by grinding the lens so as to change the cross section of the insert and thereby put the prism either up or down.

The optical center of the main lens may be located typically as at 11.

In Figure 2 it will be noted that the superior and inferior surfaces of the raw blank are substantially parallel, the curvature varying in the usual manner, but the two surfaces being generally parallel to one another.

In Figures 5 and 7, as a result of the grinding, it will be noted that the lens blank not only is produced with an insert with the prism up or down, but the major or distance lens is likewise ground with a prism up or down corresponding to the prism ground on the minor lens or the near vision insert.

The final step is the grinding of the major or distance lens so as to remove this prism and make the superior and inferior walls thereof substantially parallel allowing the edge of the insert opposite the prism to merge into the surface of the finished lens and be represented by a line such as 3 or 4, the side surfaces of the insert being curved.

Thus, I provide three stages in the development of the lens—first, the raw blank comprising the long distance and near vision zonal insert; second, the mounting and grinding of the near vision and long distance vision portions into prisms; and third, the grinding of the lens blank so that the superior and inferior walls are substantially parallel and one edge of the insert becomes a knife edge at the superior surface of the lens.

It will be understood that I desire to comprehend within my invention such modifications as may be necessary to adapt it to varying conditions and uses.

Having thus fully described by invention, what I claim as new and desire to secure by Letters Patent, is:

1. In a method of eliminating prismatic imbalance, inserting a zonal near vision insert in a distance lens blank, selectively positioning the lens blank upon the lens block to one side of the center of a grinding tool, cementing the lens blank on the lens block, and subjecting the lens blank and insert to the grinding action of a grinding tool as thus positioned to form a prism upon the upper or lower edge of the near vision insert and to control the position of the optical center of the near vision insert.

2. In a method of controlling the optical center of the near vision portion of a bicentric bifocal, consisting of mounting a bifocal lens having a near vision insert portion and distance portions upon a lens block in eccentric relation to the center of a grinding tool, grinding the face of the lens having the insert to produce selectively a feather edge on one side of the insert and an abrupt edge on the other side of the insert and a comparatively thick edge on one side of the distance lens and a comparatively thin edge on the opposite side thereof.

3. In a method of eliminating prismatic imbalance, inserting a zonal near vision insert in a distance lens blank, selectively positioning the lens blank upon the lens block to one side of the center of a grinding tool, cementing the lens blank on the lens block, and subjecting the lens blank and insert to the grinding action of a grinding tool by grinding one face of the lens blank and near vision insert as thus positioned to form a prism upon the upper or lower edge of the near vision insert and to control the position of the optical center of the near vision insert.

4. In a method of eliminating prismatic imbalance, inserting a zonal near vision insert in a distance lens blank, selectively positioning the lens blank upon the lens block to one side of the center of a grinding tool, cementing the lens blank on the lens block, and subjecting the lens blank and insert to the grinding action of a grinding tool as thus positioned to form a prism upon the upper or lower edge of the near vision insert and a feather edge upon the edge opposite the prism edge, and to control the position of the optical center of the near vision insert.

5. In a method of eliminating prismatic imbalance, inserting a zonal near vision insert in a distance lens blank, selectively fixing in position the lens blank upon the lens block in eccentric relation to the center of the lens block with relation to the center of a grinding tool and subjecting the lens blank and insert to the grinding action of a grinding tool as thus positioned to form a prism upon the upper or lower edge of the near vision insert, and to control the position of the optical center of the near vision insert.

6. In a method of eliminating prismatic imbalance, inserting a zonal near vision insert in a distance lens blank, selectively fixing in position the lens blank upon the lens block in eccentric relation to the center of the lens block with relation to the center of a grinding tool and subjecting the lens blank and insert to the grinding action of a grinding tool as thus positioned to form a prism upon the upper or lower edge of the near vision insert, a feather edge upon the edge opposite the prism edge, and to control the position of the optical center of the near vision insert.

7. In a method of eliminating prismatic imbalance, inserting a zonal near vision insert in a distance lens blank, selectively fixing in position the lens blank upon the lens block in eccentric relation to the center of the lens block with relation to the center of a grinding tool and subjecting the lens blank and insert to the grinding action of a grinding tool as thus positioned to form a prism upon the upper or lower edge of the near vision insert, and to control the position of the optical center of the near vision insert, and grinding the opposite face of the distance lens blank to make both faces substantially parallel.

8. In a method of eliminating prismatic imbalance, inserting a zonal near vision insert in a distance lens blank, selectively fixing in position the lens blank upon the lens block in eccentric relation to the center of the lens block with relation to the center of a grinding tool and subjecting the lens blank and insert to the grinding action of a grinding tool as thus positioned to form a prism upon the upper or lower edge of the near vision insert, and a feather edge upon the edge opposite the prism edge and to control the position of the optical center of the near vision insert, reversing the position of the distance lens upon the lens block to present its opposite face to the grinding tool and grinding said face to make the same substantially parallel to that of the face having the insert.

In testimony whereof, I affix my signature.

JACK R. SILVERMAN.